H. C. JONES.
FOCUSING APPARATUS.
APPLICATION FILED JUNE 28, 1915.
1,303,676.
Patented May 13, 1919.
4 SHEETS—SHEET 4.
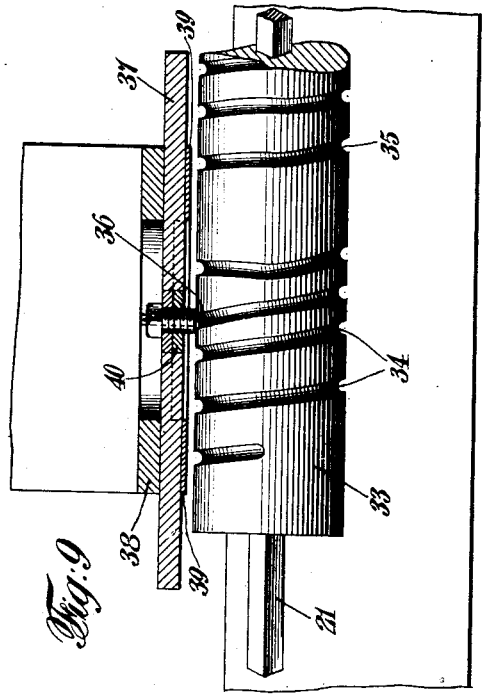
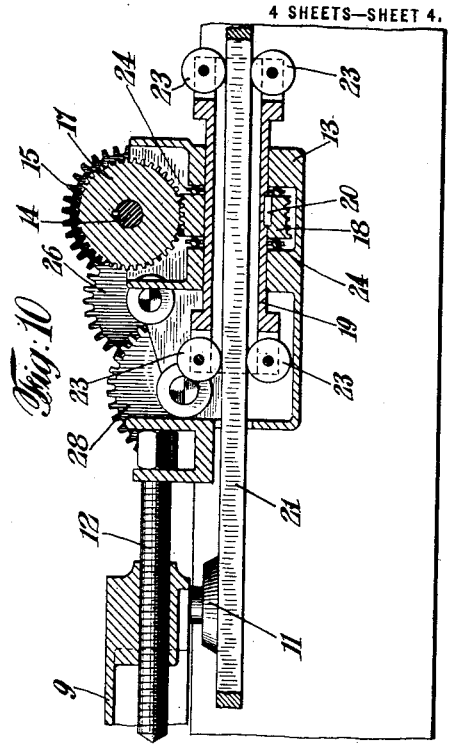
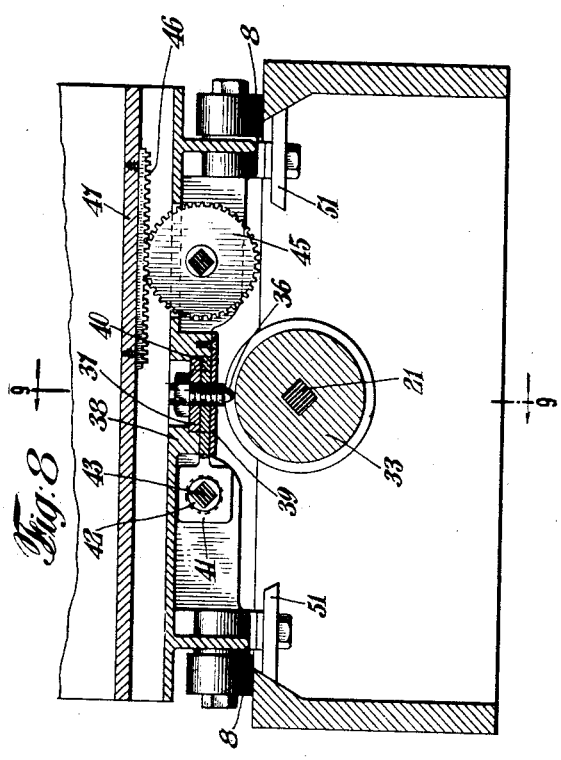
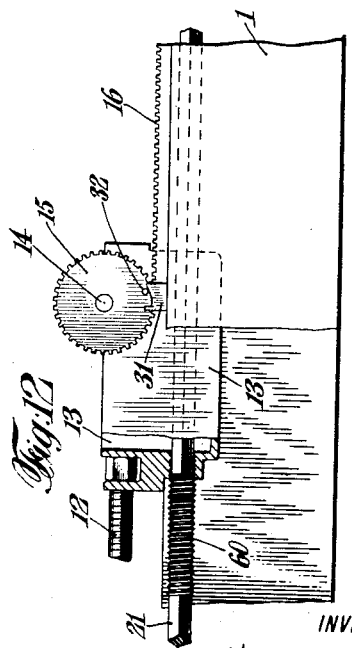
INVENTOR
Harry C. Jones
BY
Kenyon Kenyon
ATTORNEYS

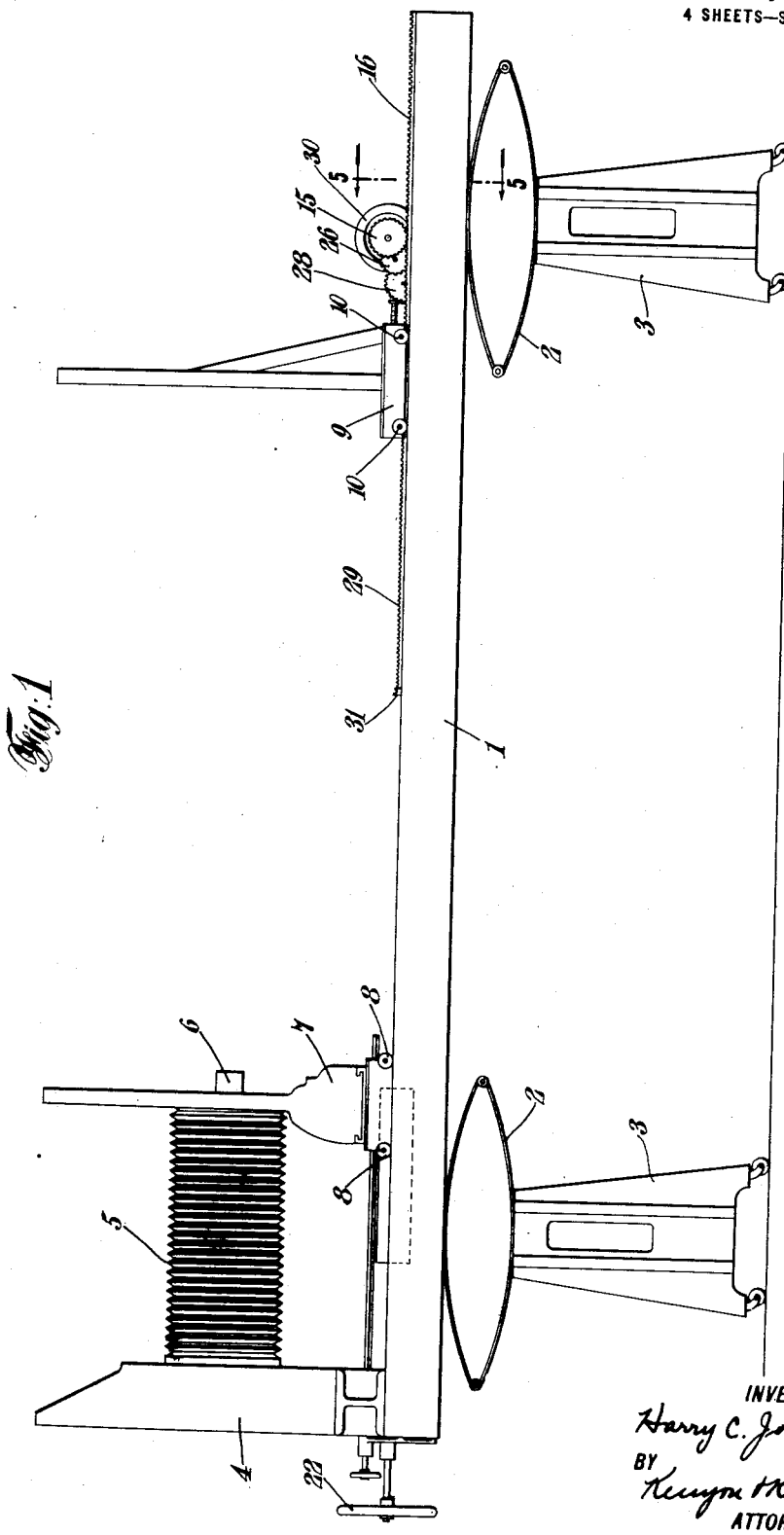

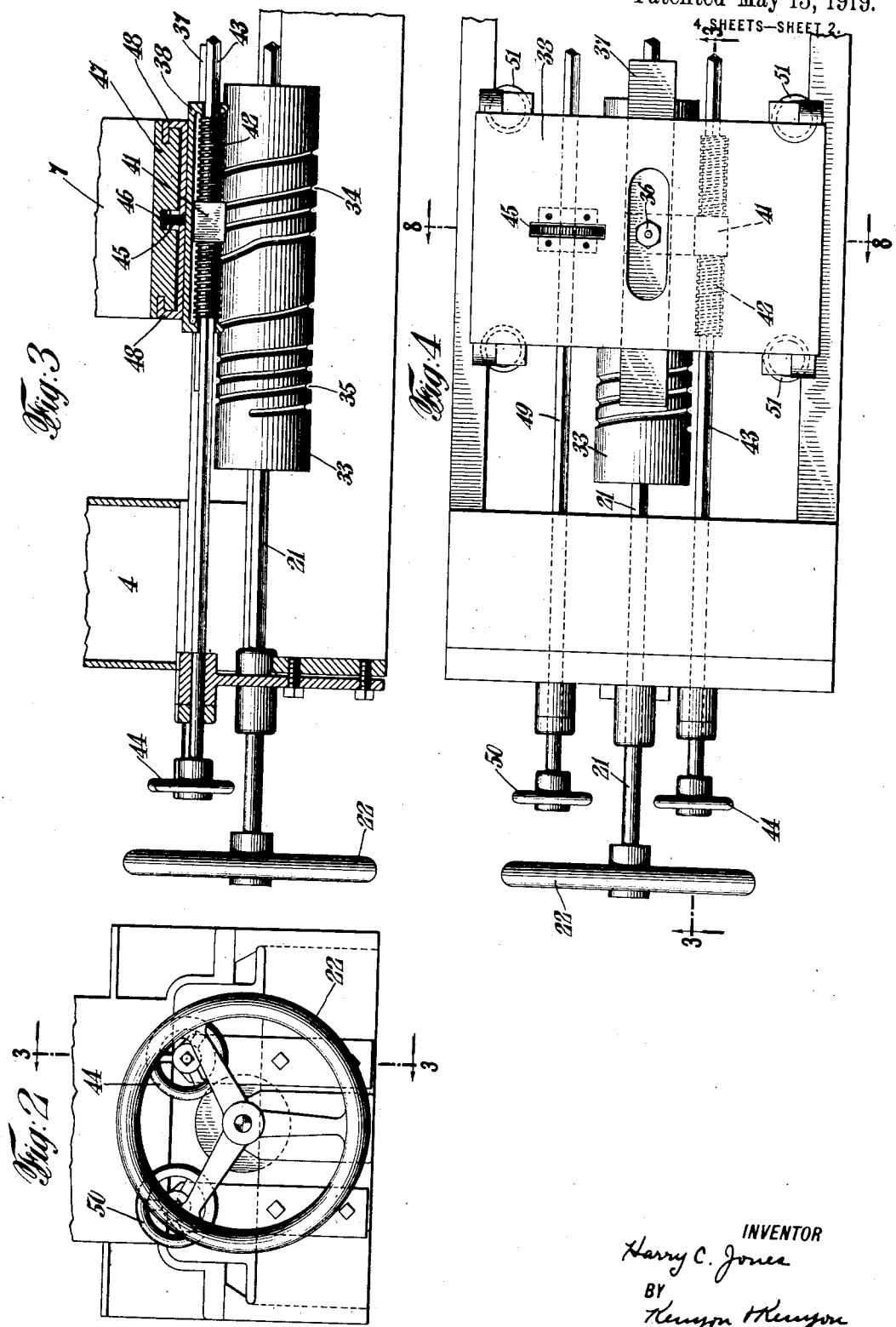

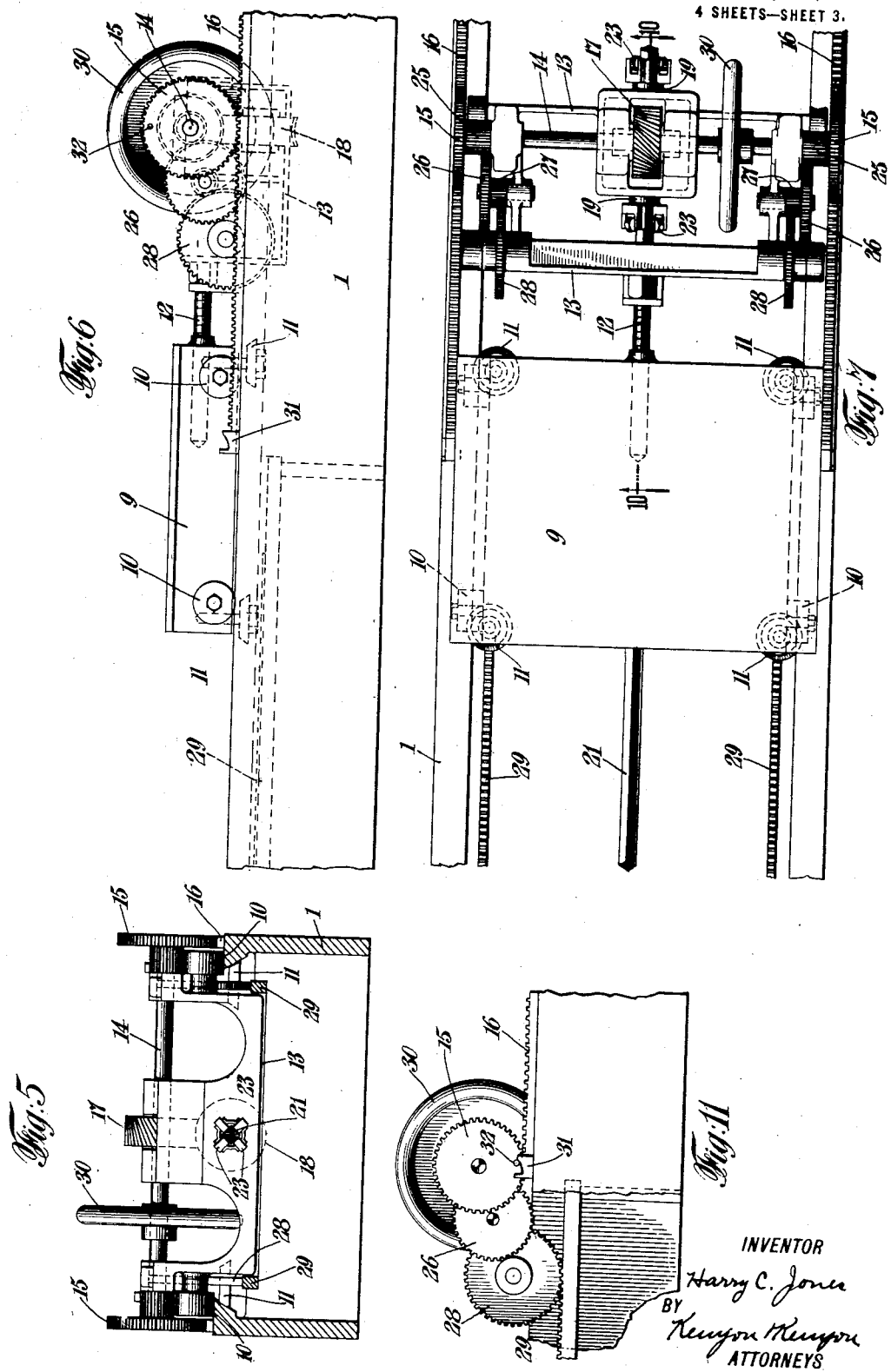

UNITED STATES PATENT OFFICE.

HARRY C. JONES, OF LARCHMONT, NEW YORK.

FOCUSING APPARATUS.

1,303,676.      Specification of Letters Patent.      Patented May 13, 1919.

Application filed June 28, 1915. Serial No. 36,685.

*To all whom it may concern:*

Be it known that I, HARRY C. JONES, a citizen of the United States, and a resident of Larchmont, county of Westchester, State of New York, have invented certain new and useful Improvements in Focusing Apparatus, of which the following is a specification.

My invention relates to improvements in focusing apparatus used in connection with cameras, and more particularly to a camera apparatus having a plate-holder, lens-holder and copy-holder and means for moving these simultaneously relatively to one another to vary the size of the image on the plate and simultaneously maintain the proper focus.

Owing to the fact that the movements of the copy and lens relatively to the plate during such an operation have a varying proportion to one another, many difficulties have been encountered in providing an apparatus which would accurately and satisfactorily accomplish this purpose.

The main object of my invention is to provide a simple apparatus which will satisfactorily accomplish this purpose and which also includes convenient means for various adjustments and is not likely to get out of order.

Further objects, features and advantages will more clearly appear from the detail description given below, taken in connection with the accompanying drawings, which form a part of this specification.

In the drawings,

Figure 1 is a side elevation of an apparatus embodying my improvements in one form;

Fig. 2 is a partial end view of the same;

Fig. 3 is a partial section taken on the line 3—3 of Fig. 2;

Fig. 4 is a plan view of the left hand end of the apparatus of Fig. 1, the camera being removed in order to more clearly illustrate the parts thereof;

Fig. 5 is a section taken on the line 5—5 of Fig. 1;

Fig. 6 is a partial side view of the apparatus enlarged;

Fig. 7 is a plan view of part of the right hand end of the apparatus of Fig. 1;

Fig. 8 is a section taken on the line 8—8 of Fig. 4;

Fig. 9 is a detail section taken on the line 9—9 of Fig. 8;

Fig. 10 is a detail section taken on the line 10—10 of Fig. 7;

Fig. 11 is a detail of parts shown in Fig. 6, showing the gears in another position; and Fig. 12 is a similar view showing a modification.

Referring to the drawings, 1 represents a suitable bed or frame carried upon springs 2 supported by standards 3. At one end of the frame 1 and carried rigid therewith is a plate-holder 4 of a camera 5 having a lens 6 carried by a lens-holder 7 slidable longitudinally of the frame 1 on rollers 8. At the other end of the frame 1 is a copy-holder 9, also longitudinally slidable along the frame 1, on rollers 10. The copy-holder 9 is also provided with beveled anti-friction rollers 11, which accurately guide the copy-holder in its movement over frame 1. Adjustably connected to the copy-holder 9, by means of a screw 12, is a frame 13, in which is journaled a shaft 14, carrying gears 15, meshing with racks 16 on each side of the frame, so that, upon turning the shaft 14, the copy-holder 9 is moved longitudinally of the frame. To turn the shaft 14, there is rigidly secured thereon a spiral gear 17, meshing with a spiral gear 18, rigidly secured to a sleeve 19 by means of a key 20. Extending through the sleeve 19 and longitudinally of the frame 1 is a square shaft 21, having at its front end, adjacent the camera, a hand-wheel 22 thereon for turning the shaft. The sleeve 19 is provided with roller bearings 23, engaging the flat faces of shaft 21. Suitable bearings 24 are provided between the gear 18 and the frame 13 (see Fig. 10). By turning the operating member, comprising wheel 22 and shaft 21, sleeve 19 is rotated by reason of the engagement with the flat faces of the shaft 21 of the roller bearings 23, thereby rotating gear 18, which rotates gear 17 and shaft 14, driving the gears 15, which, meshing with the racks 16, operate to move the copy-holder 9 toward and from the plate-holder 4. The shaft 14 also carries two small gears 25, which mesh with larger gears 26 carried on stud shafts in the frame 13, which stud shafts also carry small gears 27, meshing with larger gears 28, also carried on stud shafts in the frame 13.

After the copy-holder 9 has been moved a certain distance toward the plate-holder 4 by means of the gears 15 and racks 16, the gears 28 are adapted to come into mesh with another set of racks 29 carried on the frame 1, and thereafter, for a given movement of the wheel 22 and shaft 21, cause a further movement of the copy-holder 9 toward the plate-holder, but at a much reduced speed. The shaft 14 is provided with a second operating-member or hand-wheel 30, so that the apparatus may be operated from either end.

It will, therefore, be seen that, as the operating members 22 or 30 are turned, the copy-holder is first moved toward the plate holder at one relative speed, and, after a certain point in this movement is reached, further movement of the copy-holder toward the plate-holder takes place at a relatively reduced speed by reason of the second set of reducing gears 25, 26, 27, 28, engaging racks 29.

In order that the movement of the copy-holder 9, from the point where gears 15 leave rack 16 to the point where gears 28 engage the end of racks 29, may be a smooth one, I provide on each side of the frame 1 devices 31, which may be termed cam members, and which, when the gears 15 are on the point of leaving the rack 16, are engaged by pins 32 (see Figs. 6 and 11) in such a manner that the frame 13 is pushed forward a slight distance, in order that the gear 28 may be brought certainly and smoothly into mesh with the rack 29. The frame 13 is prevented from being lifted by the pin 32 by reason of the rollers carried by the frame 13, which rollers are similar to the rollers 11.

When the motion of the hand-wheels 22 or 30 is reversed to move the copy-holder away from the plate-holder, the pin 32 will engage the upright portion of the cam 31 and force the gear 15 into mesh with the rack 16 positively and smoothly.

In order that the lens may be simultaneously moved with the copy-holder, in order to keep the apparatus in proper focus, the shaft 21 has rigidly secured thereto a variable-pitch screw-member or element 33, having variable pitch threads 34 at one end thereof and another set of variable pitch threads 35 at the other end thereof, which threads unite and form a continuous thread over the member. These threads are engaged by a pin 36, screw-threaded into a member 37 slidably carried longitudinally of the frame 1 in base 38 of the lens-holder 7. A cap plate 39 is provided for securing member 37 in slidable position on the bottom of the base 38. The pin 36 is also screw-threaded into an arm 40 extending laterally through a slot in the member 38 and provided on its other end with a nut 41 engaging over a screw-threaded sleeve 42 rotatably mounted in the frame 38 to hold it from longitudinal movement therein. Passing through the sleeve 42 is a square shaft 43, having a hand-wheel 44 on its outer end at the front of the machine. Upon turning the hand-wheel 44 and shaft 43, screw-threaded sleeve 42 is turned, thereby moving the nut 41 relatively to the base 38, and causing the base 38 to be moved relatively to the member 37 and pin 36, so that the lens-carrier and lens may be adjusted relatively to the plate-holder and copy-holder without altering the position of the pin 36 in the threads of the variable-pitch screw 33. This is for the purpose of initially bringing the apparatus into proper focus.

Suitably journaled in the bed piece 38 is a gear 45, operating a rack 46 secured on bottom piece 47. (Bottom piece 47 is removed in Fig. 4, in order to more clearly illustrate the parts.) The bottom piece 47 is slidably adjusted laterally over the base 38 by means of guides 48. Slidably extending through the center of the gear 45 is a square shaft 49, having on its front end a hand-wheel 50. Upon turning the hand-wheel 50, the shaft 49 operates the gear 45 in whatever position the lens carrier may be, which in turn, by its engagement with rack 46, causes the lens-carrier to be moved transversely of the optical axis of the lens, so as to bring the image into proper position on the photographic plate. In order that the lens carrier 7 may be accurately guided longitudinally of the frame, base 38 is provided with guiding rollers 51.

As the copy-holder is moved from the other end of the frame toward the plate by the gears 15 operating on rack 16, the lens is moved by reason of the screw 36 engaging the threads 34 on screw 33, the screw 33 being simultaneously rotated, so that the apparatus is maintained in focus throughout such movement. The variable pitch of the thread 34 may be determined in any suitable way. For instance it may be plotted mathematically from the laws relating to focus, for the particular lens to be used. When, however, the copy-holder reaches a position where the gears 15 are at the end of the racks 16, if the movement of the copy-holder 9 were continued at the same relative speed, the threads on the screw 33 would be so far apart, or of such great pitch, that they would not properly drive the lens-carrier, and, if they were ranged of proper pitch to properly drive the lens-carrier during this period of movement, the threads 34 would be so close together that such an arrangement might be undesirable. Accordingly, at this point the gears 28 engage the rack 29, so that the copy-holder is driven at a relatively reduced speed with respect to the speed of the operating member 21 and screw 33, whereby the lens may be given a relatively greater movement per unit of movement of the copy-holder.

In the modification shown in Fig. 12, the parts are the same, except that, instead of relatively reducing the speed of the copy-holder 9 by means of reducing gears, this is accomplished by means of the frame 13, when the gears 15 have reached the end of the racks 16, coming into operative engagement with screw-threads 60 on shaft 21, whereby the copy-holder 9 is thereafter moved by the screw-threads 60 operating the frame 13.

Obviously, many other modifications and changes may be made in the apparatus, and, while I have described my improvements in great detail with respect to preferred embodiments thereof, I do not desire to be limited to such details, but intend to cover all constructions coming within the language of the appended claims.

Having fully and clearly described my invention, what I claim and desire to secure by Letters Patent of the United States is the following:—

1. In an apparatus of the class described, the combination of a plate-holder, a lens-carrier, and a copy-holder, means for moving the copy-holder relatively toward and from the lens, and means operated with the copy-holder moving means simultaneously moving the lens relatively to the plate-holder to keep the apparatus in proper focus, one of said moving means comprising two moving elements, one driving the part moved thereby during part of the movement of the copy-holder and the other driving said part during a further movement of the copy-holder.

2. In an apparatus of the class described, the combination of a plate-holder, a lens-carrier, and a copy-holder, means for moving the copy-holder relatively toward and from the lens, and means operated with the copy-holder moving means simultaneously moving the lens relatively to the plate-holder to keep the apparatus in proper focus, the means moving the copy-holder comprising two driving elements, one moving the copy-holder during part of its movement and the other moving the copy-holder during another part of its movement.

3. In an apparatus of the class described, the combination of a frame, a plate-holder fixed to the frame, a lens-carrier and a copy-holder movably carried on the frame, means for moving the copy-holder over said frame toward and from the lens, and means operated with the copy-holder moving means for simultaneously moving the lens-carrier over said frame relatively to the plate-holder to keep the apparatus in proper focus irrespective of the change in position of the copy-holder, the means moving the copy-holder comprising two driving elements, one moving the copy-holder during part of its movement and the other moving the copy-holder during another part of its movement.

4. In an apparatus of the class described, the combination of a plate-holder, a lens-carrier, a copy-holder, an operating member, means connected therewith for moving the copy-holder relatively to the plate-holder at one speed during part of the movement and at another speed during another part of the movement, and means connected with said operating member for simultaneously moving the lens-carrier during both parts of said movement to keep the apparatus in proper focus irrespective of the change in position of the copy-holder relative to the plate-holder.

5. In an apparatus of the class described, the combination of a plate-holder, a lens-carrier, a copy-holder, an operating member, means connected therewith for moving the copy-holder relatively to the plate-holder at one speed during part of the movement and at another speed during another part of the movement, and a variable-pitch screw connected with said operating member for simultaneously moving the lens-carrier during both parts of said movement to keep the apparatus in proper focus irrespective of the change in position of the copy-holder relative to the plate-holder.

6. In an apparatus of the class described, the combination of a plate-holder, a lens-holder, a copy holder, an operating member, a rack, gears driven on said rack by said operating member for moving one of said holders at a plurality of different constant speeds, and means operated by said operating member for simultaneously moving another of said holders at a variable speed to keep the apparatus in proper focus notwithstanding the change in position of said holders.

7. In an apparatus of the class described, the combination of a plate-holder, a lens-carrier, a copy-holder, an operating member, a rack, gear mechanism operated by said operating member for moving the copy-holder relatively to the plate-holder, and means connected with said operating member for simultaneously moving the lens carrier to keep the apparatus in proper focus irrespective of the change in position of the copy-holder relative to the plate-holder, the gears being divided into two sets, one set moving the copy-holder at one speed during one part of its movement and the other set moving the copy-holder at a materially reduced speed during another part of its movement.

8. In an apparatus of the class described, the combination of a plate-holder, a lens-carrier, a copy-holder, an operating member, a rack, gear mechanism operated by said operating member for moving the copy-holder relatively to the plate-holder, and a variable pitch screw connected with said operating member for simultaneously moving the lens carrier to keep the apparatus in proper focus irrespective of the change in position of the copy-holder relative to the plate-holder, the gears being divided into two sets, one set moving the copy-holder at one speed during one part of its movement and the other set moving the copy-holder at a materially reduced speed during another part of its movement.

9. In an apparatus of the class described, the combination of a frame, a plate-holder, a lens-holder and a copy-holder carried thereby, an operating member, two racks carried by the frame, two sets of gears operated by the operating member and carried with the copy-holder, one set engaging one rack to move the copy-holder over the frame toward the plate-holder to a certain point and the other set engaging the other rack to move the copy-holder beyond this point toward the plate-holder at a different speed relative to that of the operating member, and means for simultaneously moving the lens-holder relatively to the plate-holder to maintain the apparatus in focus.

10. In an apparatus of the class described, the combination of a frame, a plate-holder, a lens-holder and a copy-holder carried thereby, an operating member, two racks carried by the frame, two sets of gears operated by the operating member and carried with the copy-holder, one set engaging one rack to move the copy-holder over the frame toward the plate-holder to a certain point and the other set engaging the other rack to move the copy-holder beyond this point toward the plate-holder at a different speed relative to that of the operating member, and means for simultaneously moving the lens-holder relatively to the plate-holder to maintain the apparatus in focus, said last-mentioned means comprising a variable-pitch screw driven by said operating member.

11. In an apparatus of the class described, the combination of a frame, a plate-holder, a lens-holder and a copy-holder carried thereby, an operating member, two racks carried by the frame, two sets of gears operated by the operating member and carried with the copy-holder, one set engaging one rack to move the copy-holder over the frame toward the plate-holder to a certain point and the other set engaging the other rack to move the copy-holder beyond this point toward the plate-holder at a different speed relative to that of the operating member, means for moving the copy-holder after it has reached the limit of its movement by one set of gears and before it is actuated by the other set of gears, and means for simultaneously moving the lens-holder relatively to the plate-holder to maintain the apparatus in focus.

12. In an apparatus of the class described, the combination of a plate-holder, a lens-carrier, and a copy-holder, means for moving the copy-holder relatively toward and from the lens, and means operated with the copy holder moving means simultaneously moving the lens relatively to the plate-holder to keep the apparatus in proper focus, one of said moving means comprising two moving elements, one driving the part moved thereby during part of the movement of the copy-holder and the other driving said part during a further movement of the copy-holder, and a further means for moving the part after it has reached its limit of movement by one element and before it is actuated by the other element.

13. In an apparatus of the class described, the combination of a suitable frame, a plate-holder, a lens-holder and a copy-holder, an operating member, means actuated thereby for moving the copy-holder relatively toward and from the plate-holder, means also operated by the operating member for simultaneously moving the lens relatively toward and from the plate-holder to maintain the apparatus in focus irrespective of the position of the copy-holder with respect to the plate-holder, and means for moving the lens toward and from the plate-holder independently of said copy-holder and lens-holder moving means and with the plate-holder and copy-holder relatively stationary, said last-mentioned lens moving means comprising a screw carried by the lens-carrier and a rod slidable with respect to the screw and operating the screw.

14. In an apparatus of the class described, the combination of a suitable frame, a plate-holder, a lens-holder and a copy-holder, an operating member, means actuated thereby for moving the copy-holder relatively toward and from the plate-holder, means also operated by the operating member for simultaneously moving the lens relatively toward and from the plate-holder to maintain the apparatus in focus irrespective of the position of the copy-holder with respect to the plate-holder, and means for moving one of said holders transversely with respect to the optical axis of the lens, said last-mentioned means comprising a rotatable shaft and means carried by the holder and slidable longitudinally with the holder for moving said last mentioned holder transversely.

15. In an apparatus of the class described, the combination of a suitable frame, a plate-holder, a lens-holder and a copy-holder, an operating member, means actuated thereby for moving the copy-holder relatively toward and from the plate-holder, means also operated by the operating member for simultaneously moving the lens relatively toward and from the plate-holder to maintain the apparatus in focus irrespective of the position of the copy-holder with respect to the plate-holder, means for moving one of said holders transversely with respect to the optical axis of the lens, and means for moving one of said holders parallel with the axis of the lens, with the other two holders relatively stationary.

16. In an apparatus of the class described, the combination of a suitable frame, a plate-holder, a lens-holder and a copy-holder, an operating member, means actuated thereby for moving the copy-holder relatively toward and from the plate holder, means also operated by the operating member for simultaneously moving the lens relatively toward and from the plate holder to maintain the apparatus in focus irrespective of the position of the copy-holder with respect to the plate holder, the copy-holder moving means comprising a rotatable shaft, a member rotatable therewith but carried with the copy-holder and slidable on the shaft, roller bearings interposed between said member and shaft, and means whereby rotation of said member with the shaft moves the copy-holder.

17. In an apparatus of the class described, the combination of a plate holder, a lens holder, a copy holder, an operating member, means operated thereby for moving one of said holders at a plurality of different constant speeds and means also operated by the operating member for simultaneously moving another of said holders at a variable speed to maintain the apparatus in focus at various positions of said holders.

18. In an apparatus of the character described, the combination of a plate holder, a lens holder, a copy holder, an operating member, means for driving one of said holders at constant speed and a screw cam operated by said operating member for simultaneously moving another of said holders at a variable speed to keep the apparatus in proper focus notwithstanding the change in position of said holders.

In testimony whereof, I have signed my name to this specification.

HARRY C. JONES.